United States Patent
Navada et al.

(10) Patent No.: US 7,111,093 B2
(45) Date of Patent: Sep. 19, 2006

(54) PING-PONG BUFFER SYSTEM HAVING A BUFFER TO STORE A SUBSET OF DATA FROM A DATA SOURCE

(75) Inventors: Muraleedhara Navada, Santa Clara, CA (US); Sreenath Kurupati, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 302 days.

(21) Appl. No.: 10/601,499

(22) Filed: Jun. 23, 2003

(65) Prior Publication Data

US 2004/0260903 A1    Dec. 23, 2004

(51) Int. Cl.
*G06F 3/00* (2006.01)

(52) U.S. Cl. .......................................... 710/53; 710/52

(58) Field of Classification Search .................. 710/53, 710/52, 56, 57; 711/154, 155, 165, 109
See application file for complete search history.

(56) References Cited

U.S. PATENT DOCUMENTS

| | | | | |
|---|---|---|---|---|
| 5,561,777 | A  * | 10/1996 | Kao et al. ....................... | 711/5 |
| 5,768,624 | A  * | 6/1998 | Ghosh .......................... | 710/53 |
| 6,434,655 | B1 * | 8/2002 | Agon et al. .................. | 710/310 |
| 2003/0079059 | A1* | 4/2003 | Tsai ............................. | 710/1 |
| 2004/0073703 | A1* | 4/2004 | Boucher et al. ............ | 709/245 |

* cited by examiner

*Primary Examiner*—Fritz Fleming
*Assistant Examiner*—Harold Kim
(74) *Attorney, Agent, or Firm*—Buckley, Maschoff & Talwalkar LLC

(57) ABSTRACT

According to some embodiments, a ping-pong buffer system has a buffer that stores a subset of data from a data source.

16 Claims, 8 Drawing Sheets

PING-PONG BUFFER SYSTEM HAVING A BUFFER TO STORE A SUBSET OF DATA FROM A DATA SOURCE

BACKGROUND

A data source may sequentially store blocks of data into a buffer. Moreover, a data requester may receive an entire set data from the buffer after the buffer is filled (e.g., the set of data may include multiple blocks). In some cases, the data source will continue to store blocks into the buffer before the set of data is provided to the data requestor (e.g. by storing a block in a first location in the buffer after a last location is filled). As a result, it is possible that the data source will overwrite a block of data before it is provided to the data requestor (and therefore the set of data may be incorrect).

DETAILED DESCRIPTION

Figure 1:
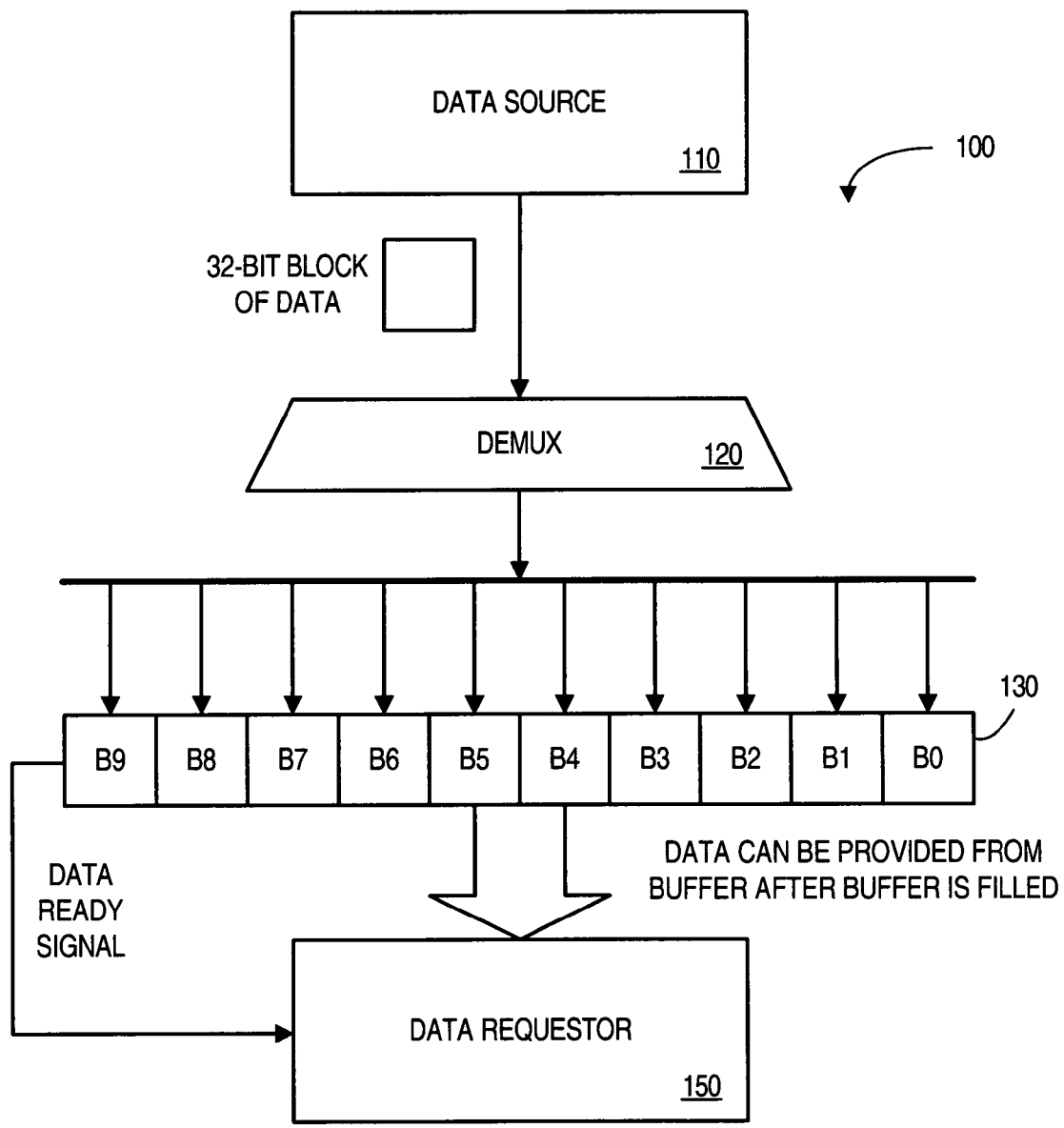
FIG. 1 is a block diagram of a system including a buffer.

A data source may sequentially store blocks of data into a buffer. For example, FIG. 1 is a block diagram of a system 100 including a buffer 130 that receives 32-bit blocks of data from a data source 110 (e.g., once per cycle). In particular, a de-multiplexer 120 sequentially routes each block of data to a different location in the buffer 130. In the example illustrated in FIG. 1, the buffer 130 is 320 bits wide and is divided into ten 32-bit locations (B0 through B9).

The buffer 130 may provide a "data ready signal" to a data requestor 150 after the buffer 130 is filled (e.g., after a block is stored into location B9). In response to the data ready signal, the data requestor 150 may receive the entire set of data from the buffer 130 (e.g., all 320 bits).

In some cases, however, the data source 110 and the data requestor 150 will not be synchronized, and the data source 110 may continue to store blocks into the buffer 130 before the set of data is provided to the data requestor 150 (e.g. by storing a new block in location B0 and after a block is stored in location B9). As a result, it is possible that the data source 110 will overwrite a block of data before it is received by the data requestor 150 (and therefore the set of data received by the data requestor 150 may be incorrect).

Assume, for example, that there is a three cycle delay between the time the data ready signal is generated and the time the data is provided to the data requestor 150. In this case, locations B0 through B2 may have already been overwritten with new data before the original set of data is provided to the data requestor 150.

Figure 2:
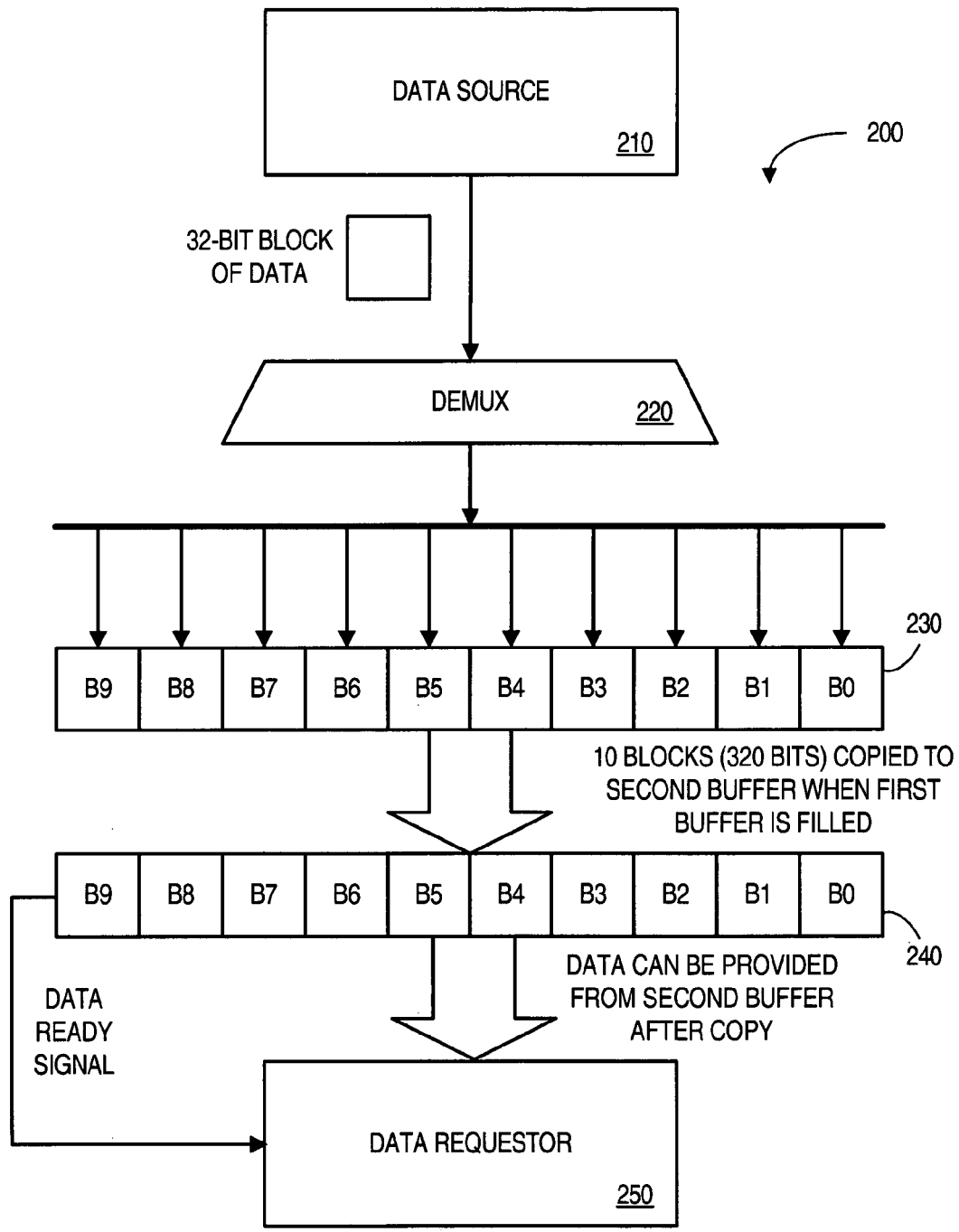
FIG. 2 is an example of a ping-pong buffer system.

To avoid this problem, a "ping-pong" buffer system may be provided. For example, FIG. 2 illustrates a ping-pong buffer system 200. As before, a de-multiplexer 220 receives 32-bit blocks of data from a data source 210 (e.g., once per cycle). The de-multiplexer 220 sequentially routes each block to one of ten locations in a first buffer 230 that is 320 bits wide.

In this case, however, the data in the first buffer 230 is copied to a second buffer 240 after the first buffer 230 is filled (e.g., after a block is stored into location B9). A data ready signal is then provided to a data requestor 250, which will eventually retrieve the entire set of data from the second buffer 240.

The data source 210 may continue to store blocks into the first buffer 230 before the set of data is provided to the data requestor 250. Because the data requestor 250 is receiving information from the second buffer 250, the data source 210 will not overwrite a block of data before it is provided (assuming that data requestor 250 receives the data within ten cycles). Assume again that there is a three cycle delay between the time the data ready signal is generated and the time the data is provided to the data requestor 250. In this case, locations B0 through B2 in the first buffer 230 may have already been overwritten with new data, but all of the locations in the second buffer 240 will remain unchanged.

Although the ping pong buffer system 200 may prevent incorrect data from being provided to the data requestor 250, the area and gate count required to implement the second buffer 240 in additional to the first buffer 230 may be substantial (e.g., when the buffers are large and/or there are a lot of ping-pong buffer systems).

Ping Pong System

Figure 3:
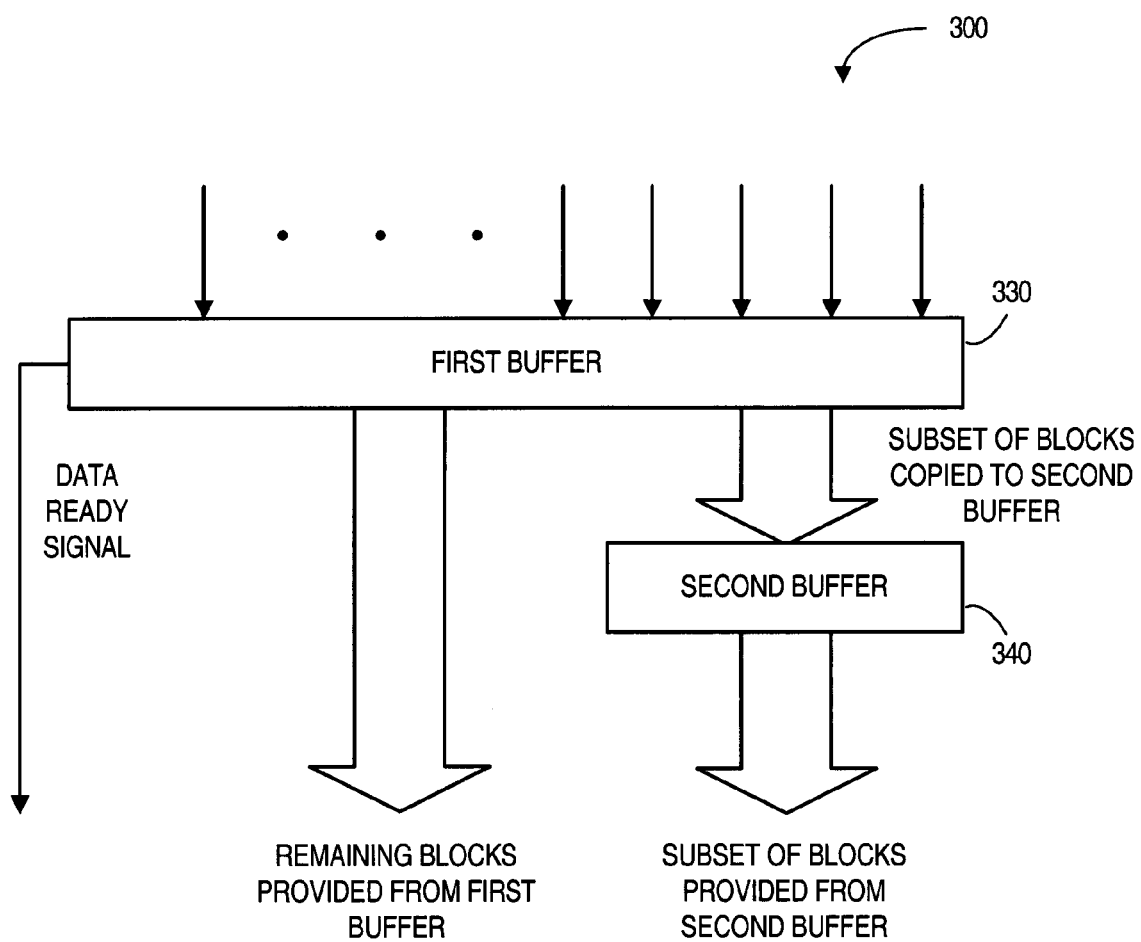
FIG. 3 is a block diagram of a ping-pong buffer system according to some embodiments.

FIG. 3 is a block diagram of a ping-pong buffer system 300 according to some embodiments. The system 300 includes a first buffer 330 to store a set of data from a data source and a second buffer 340 to store a "subset" of the data (i.e., less than all of the data). In addition, data may be provided from one of the first and second buffers 330, 340 after data is overwritten in a corresponding location in the other buffer.

In the embodiment illustrated in FIG. 3, the first buffer 330 receives the set of data (e.g., from a data source). For example, each cycle the data source might write a block of data into a sequential location in the first buffer 330.

The subset of data is copied from the first buffer 330 to the second buffer 340. For example, the subset of data may be copied after the locations in the first buffer 330 that correspond to the second buffer 340 are filled.

After the first buffer 330 is filled, a data ready signal is provided (e.g., to a data requester). The data source may continue to store additional data in the first buffer 330 (e.g., overwriting the subset of data that was copied to the second buffer 340). The data requestor may then to receive (i) the subset of data from the second buffer 340 and (ii) the remaining data from the first buffer 330.

Note that because the second buffer 340 is smaller than the first buffer 330, the area and gate count required to implement the ping-pong buffer system 300 may be reduced, for example, in an Application Specific Integrated Circuit (ASIC) device, an Field-Programmable Gate Array (FPGA) device, and/or a custom integrated circuit.

Figure 4:
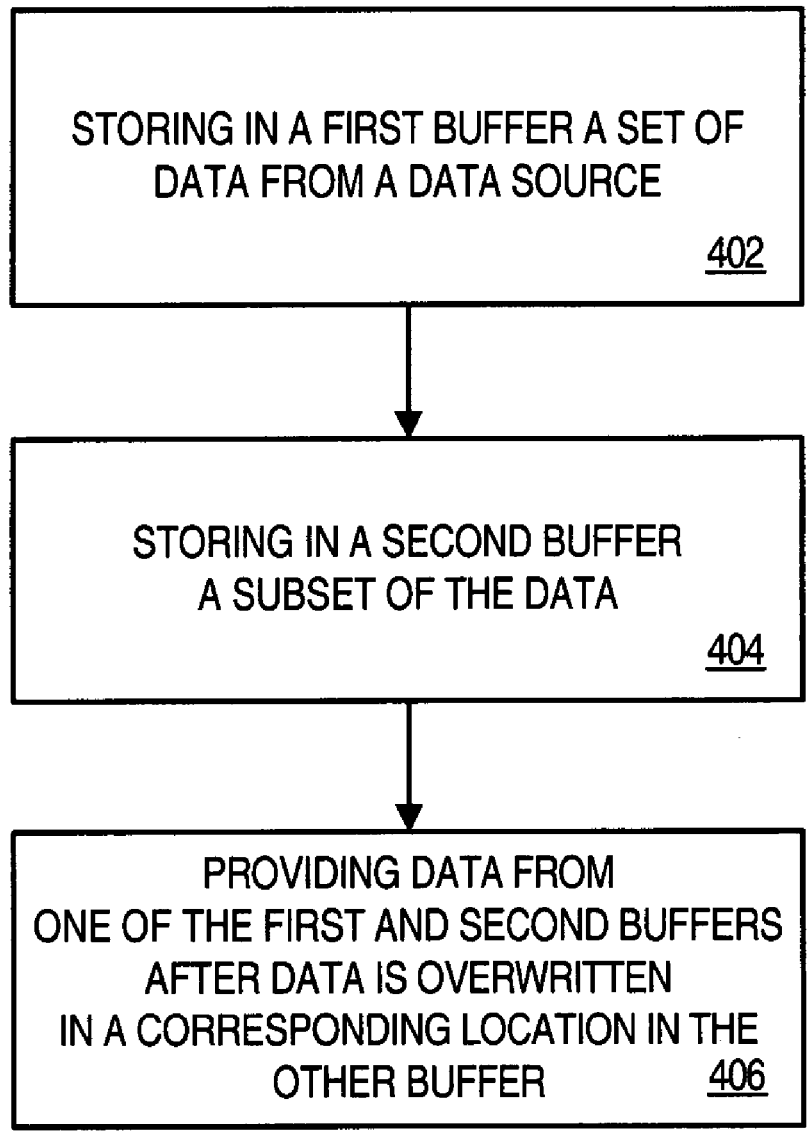
FIG. 4 is flow chart of a method according to some embodiments.

FIG. 4 is a flow chart of a method according to some embodiments. The flow charts described herein do not necessarily imply a fixed order to the actions, and embodiments may be performed in any order that is practicable. Note that any of the methods described herein may be performed by firmware, hardware, software, or any combination of these techniques. For example, a storage medium may store thereon instructions that when executed by a machine result in performance according to any of the embodiments described herein.

At 402, a first set of data (e.g., from a data source) is stored in a first buffer. A subset of data is stored in a second buffer at 404. At 406, data from one of the first and second buffers is then provided (e.g., to a data requester) after data is overwritten in a corresponding location in the other buffer.

Consider, for example, the system 300 illustrated in FIG. 3. Moreover, assume that the first buffer 330 can store N blocks, the second buffer 340 can store C blocks (C being less than N), and that each block has m bits. That is, the first buffer 330 is w bits wide (where w=N×m), and the second buffer 340 is C×m bits wide.

After C blocks are stored into the first buffer 330, those C blocks are copied from the first buffer 330 to the second buffer 340 (C×m bits are copied). In addition, a data ready signal is provided to a data requester after all N blocks are stored into the first buffer 330. According to some embodiments, the C blocks are not copied from the first buffer 330 to the second buffer 340 until all N blocks are stored into the first buffer 330.

The data requestor may then receive the C blocks from the second buffer 340 (C×m bits) and the remaining blocks from the first buffer 330 (the remaining w−(C×m) bits). As a result, the data source can continue storing up to C new blocks into the first buffer 330 before (and while) the data requestor receives information without destroying the information that will be received by the data requestor (so long as the maximum latency between the time the data ready signal is generated and the time the information is provided to the data requestor is less than C cycles).

Example

Figure 5:
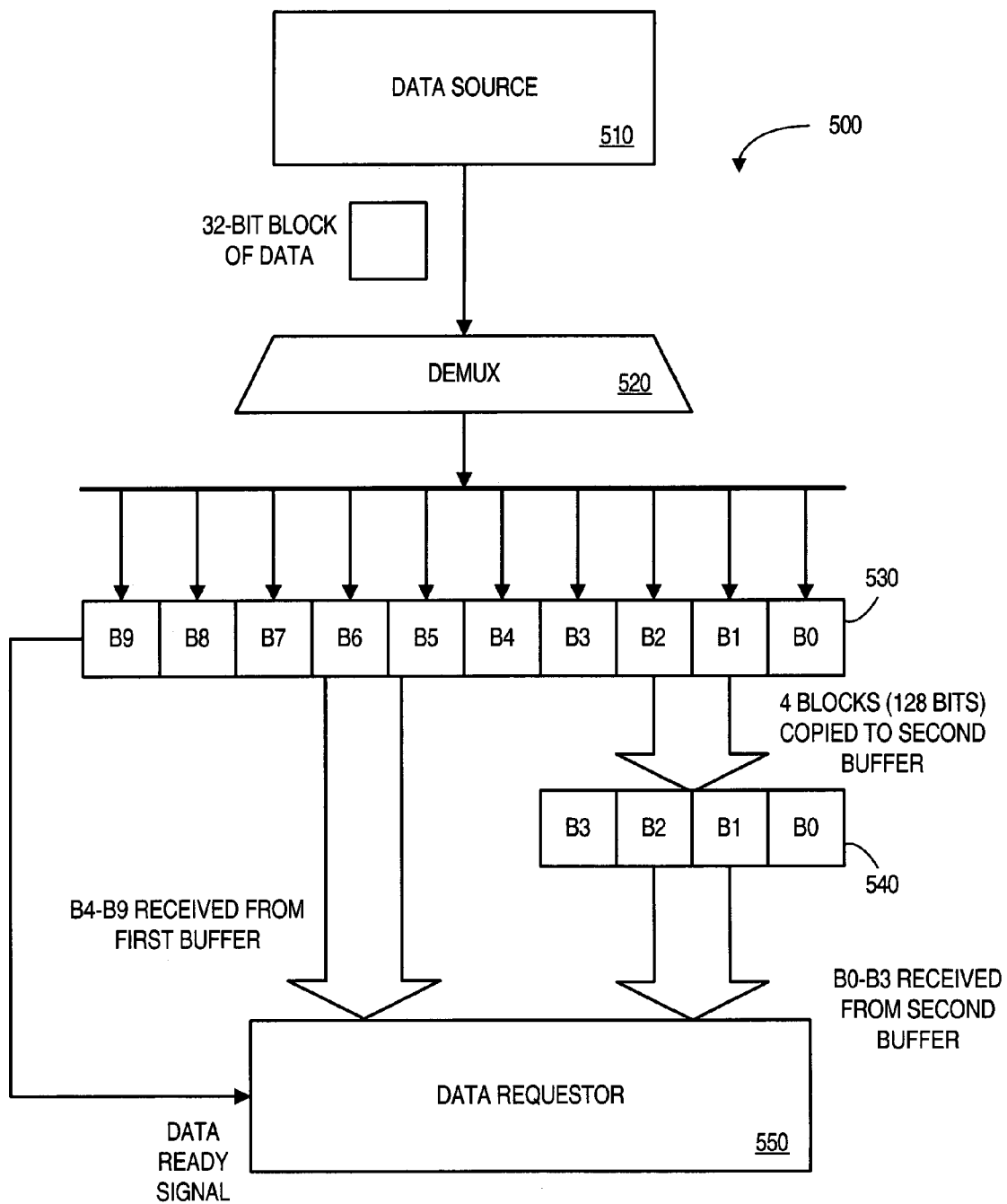
FIG. 5 is an example of a ping-pong buffer system according to some embodiments.

FIG. 5 is an example of a ping-pong buffer system 500 according to some embodiments. Each cycle, a de-multiplexer 520 receives a 32-bit block of data from a data source 510. The de-multiplexer 520 sequentially routes each block to one of ten locations in a first buffer 530 that is 320 bits wide (locations B0 through B9).

After locations B0 through B3 are filled, the information in those four blocks is copied to a second buffer 540 that is 128 bits wide. After all ten locations in the first buffer 530 are filled (e.g., after ten cycles), a data ready signal is provided to a data requester 550.

The data source 510 may continue to store blocks into the first buffer 530 before the set of data is provided to the data requestor 550. When the data requestor 550 is ready, it can receive blocks B0 through B3 from the second buffer 540 and blocks B4 through B9 from the first buffer 530.

Because the data requestor 550 is receiving information from the second buffer 550, the data source 510 will not overwrite a block of data that is provided (assuming that data requestor 550 receives the data within four cycles). For example, if the latency between the time the data ready signal is generated and the time the data is received by the data requestor 550 is three cycles, locations B0 through B2 in the first buffer 530 may have already been overwritten with new data. The corresponding locations in the second buffer 540, however, have not been.

Some of the embodiments described herein may be associated with, for example, a packet network, a Local Area Network, a switch, and/or a router. By way of example only, consider an Ethernet switch or router that operates in accordance with the Fast Ethernet Local Area Network (LAN) transmission standard 802.3-2002® published by the Institute of Electrical and Electronics Engineers (IEEE). The switch or router may have a number of input ports (e.g., 27 input ports), and information packets may be received at several of those input ports. In this case, a Media Access Control (MAC) module associated with each input port might request to have an information packet processed by a resource. An arbiter unit may then select the requester to which the resource will be allocated (and thus which information packet will be processed).

Figure 6:
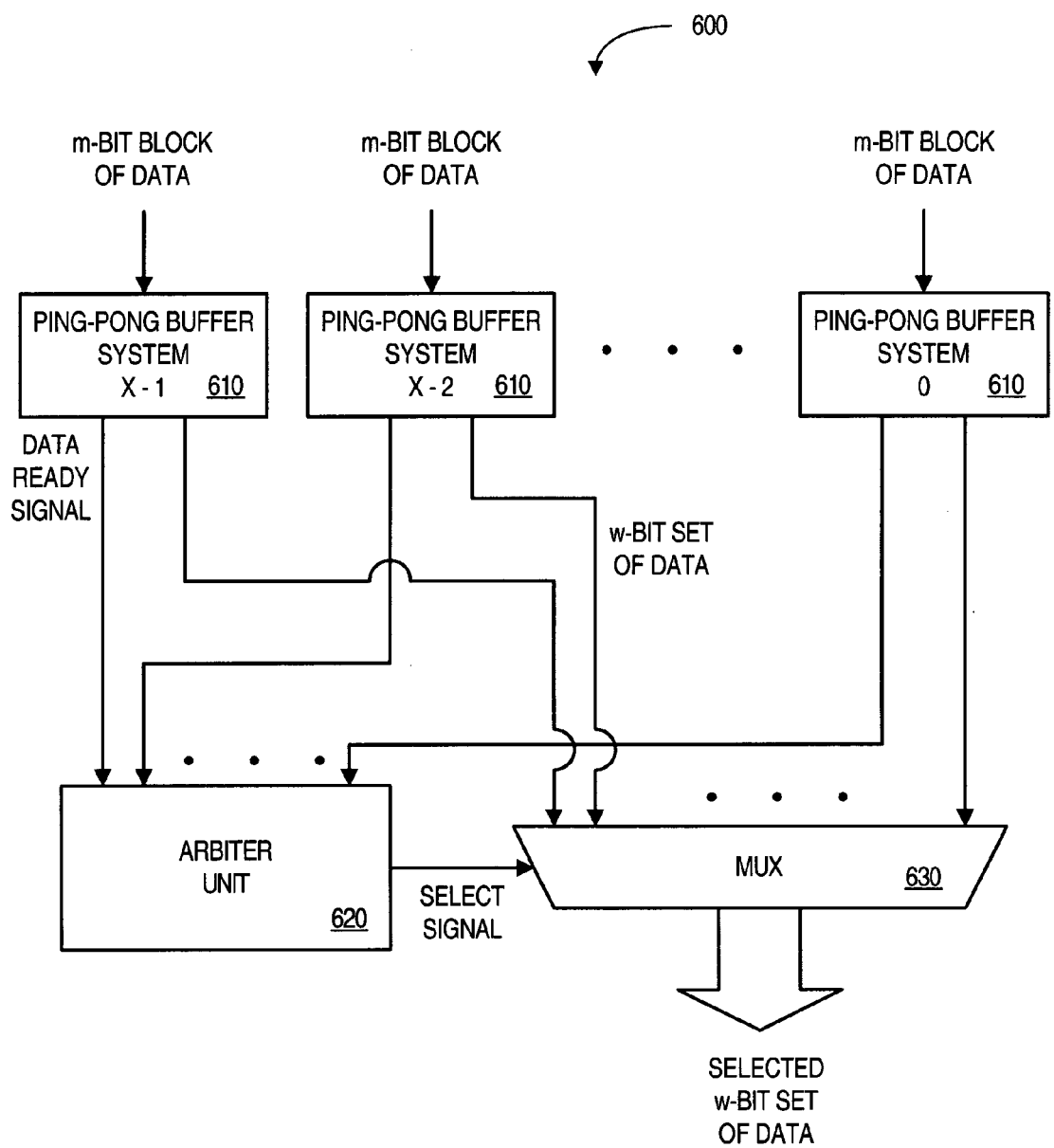
FIG. 6 is an arbitration system according to some embodiments.

FIG. 6 is an arbitration system 600 according to some embodiments. The system 600 includes X ping-pong buffer systems 610 that each receive an m-bit block of data from a data source, provide a data ready signal to an arbiter unit 620, and provide a set of data to a multiplexer 630.

Moreover, a ping-pong buffer system "i" (where i can represent 0 through X−1) has a first buffer that can store N blocks and a second buffer can store $C_i$ blocks ($C_i$ being less than N) in accordance with any of the embodiments described herein (and the first buffer is w bits wide, where w=N×m, while the second buffer is $C_i$×m bits wide). Different ping-pong buffer systems 610 might have second buffers of different sizes if, for example, the maximum latencies of the arbiter unit 620 with respect to those buffers are different.

Consider an arbiter unit 620 that uses a "round-robin" approach to select sets of data from ping-pong buffer systems 610 (e.g., by using the select signal to route sets of data from systems 0 through X−1 sequentially). In this case, it could take up to X cycles for the arbiter unit 620 to select any one of the ping-pong buffer systems 610. As a result, every ping-pong buffer system 610 would have a $C_i$ equal to X.

By way of example only, assume that there are six ping-pong buffer systems 610, that each block is sixty four bits wide (m=64), and that a complete set of data has sixteen blocks (and is therefore 1026 bits wide, because w=16×64=1026. If the approach described with respect to FIG. 2 is used, then each system 610 will have two separate 1026-bit buffers (and all six systems 610 together will need to store 12312 bits). If, on the other hand, the approach described with respect to FIG. 3 is used along with round-robin arbitration, then $C_i$ will be six for each system (because each system is guaranteed to be selected, and read from, within six cycles). As a result, each system 610 will have one 1026 bit buffer and one 384-bit buffer (64 bits/block* 6 blocks), and the six systems 610 together only need to store 8460 bits.

The size of the second buffer may be reduced even further if priority encoding based arbitration is used instead of round-robin arbitration (e.g., by selecting system 0 if the data ready signal is present, otherwise selecting system 1 if the data ready signal is present, and so on). In this case, the maximum latency for different systems 610 will be different ($C_1$ is 1, $C_2$ is 2, $C_3$ is 3, and so on) and the six systems 610 together only need to store 7491 bits.

Switch

Figure 7:
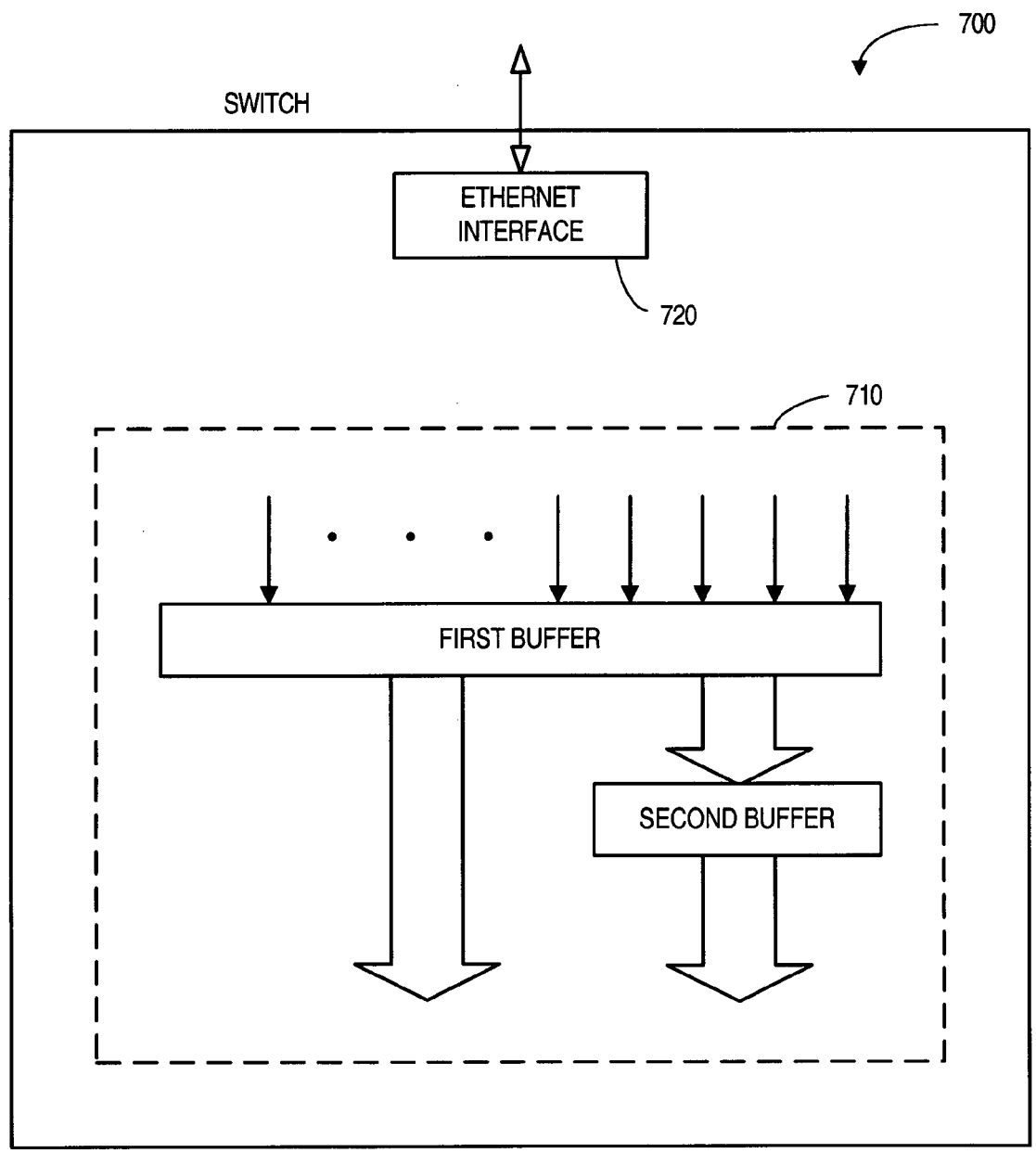
FIG. 7 is a switch according to some embodiments.

FIG. 7 is a switch 700 according to some embodiments. The switch 700 may be, for example, a 24+2 Gigabit Ethernet device. The switch 700 includes an arbitration unit 710 that operates in accordance with any of the embodiments described herein. The switch 700 also includes an Ethernet interface 720 that may facilitate an exchange of information via a network. According to other embodiments, the switch 700 includes an Asynchronous Transfer Mode (ATM) interface instead of, or in addition to, the Ethernet interface 720.

Additional Embodiments

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, some embodiments are directed to networks (e.g., packet networks, LANs and/or Ethernet networks) and network devices (e.g., switches and/or routers). Note, however, that embodiments may also be directed to other environments (e.g., outside of the network context).

In addition, although specific designs have been described herein, any number of other designs may be implemented. Consider, for example, FIG. 8 which is a block diagram of a ping-pong buffer system 800 according to another embodiment. As before, the system 800 includes a first buffer 830 to store a set of data from a data source and a second buffer 840 to store a subset of the data (i.e., less than all of the data). In addition, data may be provided from one of the first and second buffers 330, 340 after data is overwritten in a corresponding location in the other buffer.

Figure 8:
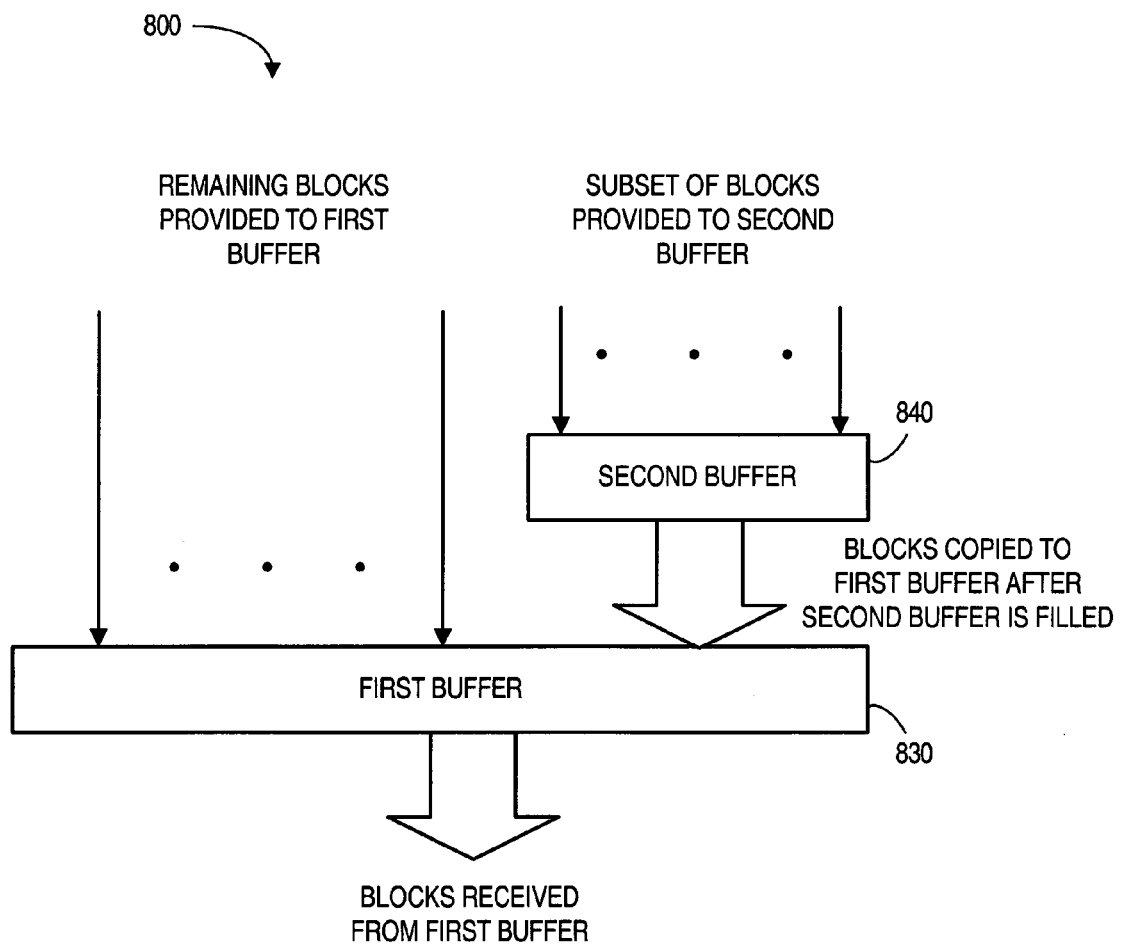
FIG. 8 a block diagram of a ping-pong buffer system according to another embodiment.

In the embodiment illustrated in FIG. 8, the second buffer 840 initially receives a subset of data directly from a data source. For example, each cycle the data source might a write block of data into a sequential location in the second buffer 840.

After all of the locations in the second buffer 840 are filled, the subset of data is copied from the second buffer 840 to the first buffer 830. Moreover, the data source now begins to store the rest of the data directly into the first buffer 830.

When the first buffer 830 becomes filled, a data ready signal is provided (e.g., to a data requester). The data requester may then eventually receive the entire set of data from the from the first buffer 830. Note that by that time, the data source may have already begun to overwrite some of the data in the second buffer 840 (but that new data has not yet been transferred to the first buffer 830).

According to some embodiments, a data source provides blocks of data that have multiple bits. According to other embodiments, a data source provides data on a bit-by-bit basis.

The several embodiments described herein are solely for the purpose of illustration. Persons skilled in the art will recognize that other embodiments may be practiced with modifications and alterations limited only by the claims.

What is claimed is:

1. An apparatus, comprising:
   a first buffer to store a set of data provided by a data source; and
   a second buffer to store a subset of the data, wherein (i) the set of data is to be provided for a data requestor from at least one of the first and second buffers while the subset of the data is being overwritten in corresponding locations in the first buffer, (ii) the subset of the data is copied between the first and second buffers, and (iii) the second buffer is not overwritten until the subset of data is received by the data requestor.

2. The apparatus of claim 1, wherein the first buffer is to receive the set of data from the data source, the subset of data is to be copied from the first buffer to the second buffer before data is overwritten in the first buffer, and the data requestor is to receive (i) the subset of data from the second buffer and (ii) the remaining data from the first buffer.

3. The apparatus of claim 2, wherein the subset of data is to be copied from the first buffer to the second buffer after the locations in the first buffer that correspond to the second buffer are filled.

4. The apparatus of claim 2, wherein a data ready signal is to be provided after the first buffer is filled.

5. The apparatus of claim 4, wherein the data ready signal is to be provided to an arbiter unit.

6. The apparatus of claim 2, further comprising:
   a de-multiplexer to receive a block of data from the data source and to sequentially store the block of data in the first buffer, wherein the subset of data comprises a number of data blocks.

7. The apparatus of claim 1, wherein the apparatus is associated with at least one of: (i) a packet network, (ii) a local area network, (iii) an Ethernet network, (iv) a switch, and (v) a router.

8. The apparatus of claim 1, wherein the apparatus is associated with at least one of: (i) an application specific integrated circuit device, (ii) a field-programmable gate array device, and (iii) a custom integrated circuit.

9. A method, comprising:
   storing in a first buffer a set of data from a data source;
   copying a subset of the data from the first buffer to a second buffer and not overwriting the second buffer until the data requestor; and
   providing the subset of the data from the second buffer to the requestor and the data from the first buffer to the data requestor while the subset of data is being overwritten in the first buffer.

10. The method of claim 9, wherein said copying is performed after the locations in the first buffer that correspond to the second buffer are filled.

11. The method of claim 9, further comprising:
    providing a data ready signal after the first buffer is filled.

12. The method of claim 11, wherein the data ready signal is to be provided to an arbiter unit.

13. A method, comprising:
    storing a first subset of data from a data source in a first buffer;
    storing data of the first subset in a second buffer, wherein the second buffer is smaller than the first buffer.
    providing a data ready signal to a data requestor, and
    overwriting the first subset in the first buffer with a second subset of data from the data source while providing the data from the first subset stored in the first buffer and the data stored in the second buffer to the data requestor.

14. An apparatus, comprising:
    a storage medium having stored thereon instructions that when executed by a machine result in the following:
    storing in a first buffer a set of data from a data source,
    copying a subset of the data from the first buffer to a second buffer and not overwriting the second buffer until the data is received by a data requestor, and
    providing the subset of the data from the second buffer to the data requestor and the remaining data from the first buffer to the data requestor while the subset of data is being overwritten in first buffer.

15. A switch, comprising:
    an Ethernet interface; and
    an arbitration system, including:
    a first buffer to store a set of data provided by a data source, and
    a second buffer to store a subset of the data, wherein (i) the set of data is to be provided for a data requestor from at least one of the first and second buffers while the subset of the data is being overwritten in corresponding locations in the other buffer and (ii) the subset of the data is copied between the first and second buffers and the second buffer is not overwritten until the data is received by the data requestor.

16. The switch of claim 15, wherein the first buffer is to receive the set of data from the data source, the subset of data is to be copied from the first buffer to the second buffer before data is overwritten in the first buffer, and a data requestor is to receive (i) the subset of data from the second buffer and (ii) the remaining data from the first buffer.

* * * * *